UNITED STATES PATENT OFFICE.

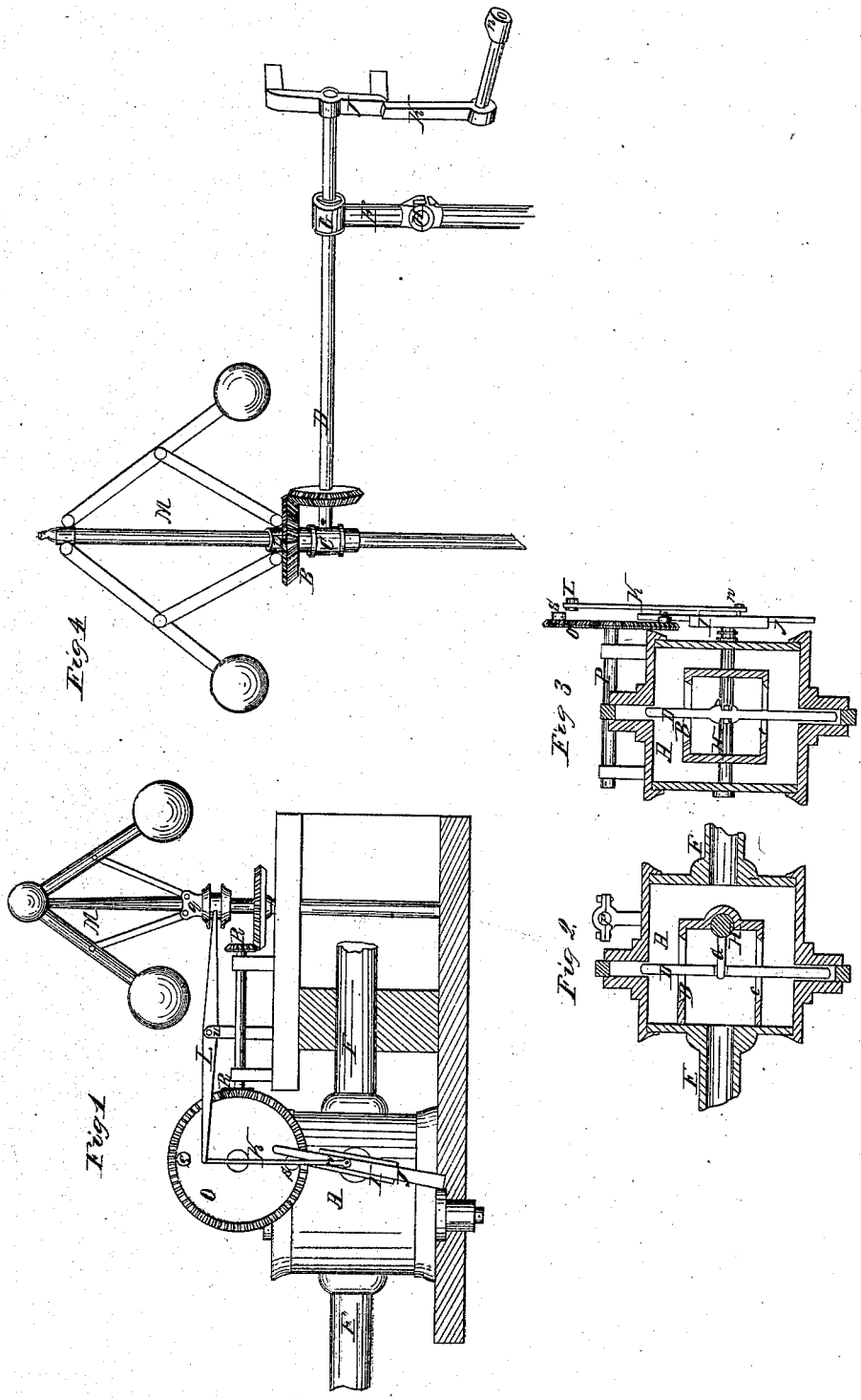

HENRY WATERMAN, OF NEW YORK, N. Y.

VARIABLE CUT-OFF REGULATED BY THE GOVERNOR.

Specification of Letters Patent No. 7,964, dated March 4, 1851.

*To all whom it may concern:*

Be it known that I, HENRY WATERMAN, of the city, county, and State of New York, have invented a new and useful Improvement in the Mode of Operating the Cut-Off Valves of Steam-Engines; and I do hereby declare that the following is a full, clear, and exact description of the same, reference being had to annexed drawings, making part of this specification, in which—

Figure 1 is a longitudinal elevation representing the machinery by which the governor is made to regulate the operation of the valve, Fig. 2 a longitudinal section of the valve box and balance valve, and Fig. 3 a transverse section of the valve box with the sliding lever and grooved arm.

The valve is constructed on the balance principle as shown in Fig. 2, (A) being the valve box, (B) and (C) the valves and (D) the valve stem. The valve may be arranged to have the stem pass through it in either direction, but in this representation (F) is the pipe that connects with the boiler and (E) the pipe that conducts the steam to the engine. (G) is a lifter projecting from the rock shaft (H.) and lifts the two valves from their seats whenever the shaft is moved by the external machinery.

The grooved arm (I), Figs. 1 and 3, is mounted vertically upon one end of the rock shaft and has in its groove a sliding lever (J). To the front of this lever, near the center thereof, is connected by the pivot (*n*) a vertical adjusting rod (K.) the top of which is connected to one end of a horizontal balance beam (L). This beam is mounted centrally upon a pivot (*z c*) and the right end thereof approaches the shaft of governor (M) and is operated vertically by the revolving slide (*q*). A vertical wheel (*o*) is mounted on one end of a horizontal shaft (P) and is put in motion by the gear pinions (R. R.), or other suitable machinery connected with the engine.

It will be understood that whatever mode of connection may be adopted, the revolutions of the wheel (*o*) must have their motion coincident with the piston. To the face of this wheel is attached two cam pins (S. S.) which alternately impinge upon the side of the sliding lever and thereby give motion to the rock-shaft (H.); the valves are thus lifted from their seats but instantly close again when the sliding lever is released from the cam pins. This machinery must be so adjusted that the cam pins shall alternately come in contact with the sliding lever at the moment that the piston of the engine changes its direction. The machinery being connected and arranged, it is obvious that by an increase of motion, the sliding lever becomes depressed so as to be less affected by the cam pins, and consequently the valves are not kept open so long as when the motion decreases and vice versa. The governor is thus made to regulate the operation of a cut-off valve to make it variable, and at the same time to regulate the motion of the engine.

Fig. 4 is a modification in which the cam is adjusted instead of the lever thereby producing the same effect upon the valves (O. O.) Fig. 4, as heretofore described. (M) is the governor, (A.) the revolving slide, having a bevel wheel (B) attached. (C) a loose collar on the revolving slide having a socket in which one end of the shaft (D) revolves, (E) a bevel wheel attached to shaft (D) and driven by the wheel (B); (F) a standard having a box (G) at one end (in which the shaft (D) revolves) vibrating on the fulcrum (H), (I.) the revolving cam, (K.) the lever or arm (L.) the rock shaft (*n*) the valve lifter (O. O.) the valves.

It will readily be seen that the governor (M.) raising and lowering the revolving slide (A.) together with loose collar (*c*) and the revolving shaft (D), the cam (I) will have more or less contact with the arm or lever (K.).

The movement of opening the valves may be connected to the engine by means of gear wheels or by a band or chain.

The above described improvements may also be applied to operate throttle, faucet, sliding or other valves, when used as cut off valves.

What I claim as my invention and desire to secure by Letters Patent is—

Regulating a variable cut off valve by a motion derived from and corresponding to that of the governor, by means of a toe or vibrating lever attached to the rock shaft, acted upon by revolving pins or cams, when either the cams are made to vary in position with respect to the toe, or the toe in length with respect to the cams; the whole machinery being constructed and acting substantially as herein described.

HENRY WATERMAN.

Witnesses:
C. W. M. KELLER,
CAUSE BROWNE.